I. Houghtling.
Milk Cooler.
No. 87,851. Patented Mar. 16, 1869.
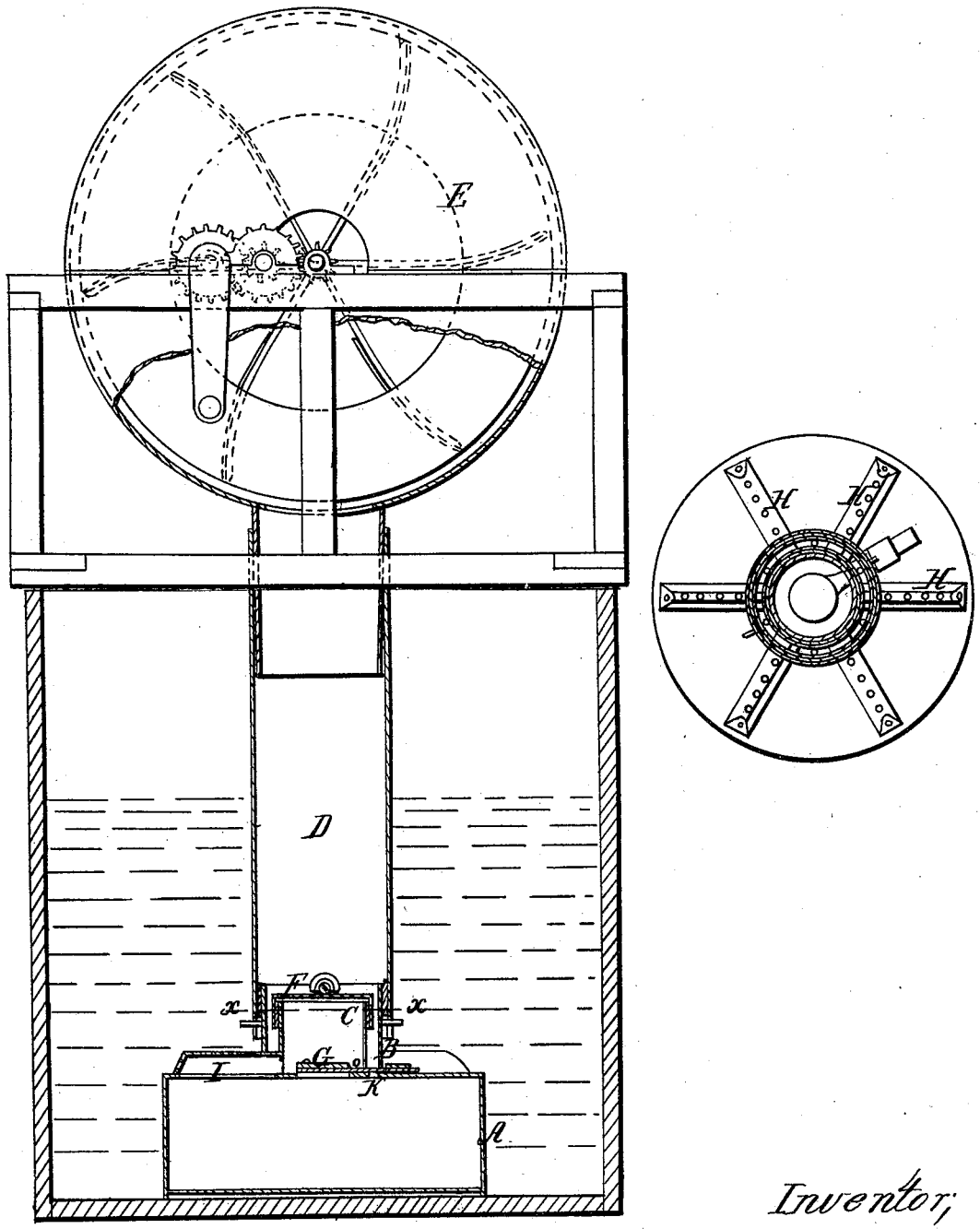
Witnesses:
E. Wolf
Wm. A. Morgan
Inventor,
Ira Houghtling
pr. 
Attorneys

IRA HOUGHTLING, OF HOUGHTON, MICHIGAN.

Letters Patent No. 87,851, dated March 16, 1869.

IMPROVEMENT IN MILK-COOLING APPARATUS.

The Schedule referred to in these Letters Patent and making part of the same.

*To all whom it may concern:*

Be it know that I, IRA HOUGHTLING, of Houghton, in the county of Houghton, and State of Michigan, have invented a new and useful Improvement in Milk-Cooling Apparatus; and I do hereby declare that the following is a full, clear, and exact description thereof, which will enable others skilled in the art to make and use the same, reference being had to the accompanying drawings, forming part of this specification.

This invention relates to improvements in apparatus for forcing air through milk and other liquids, for cooling it; and consists of a fan-blowing attachment for vessels, arranged to distribute the air throughout the liquid, as hereinafter specified.

Figure 1 represents an elevation, partly in section, of my improved apparatus, and Figure 2 represents a transverse section, taken on the line *x x* of fig. 1.

Similar letters of reference indicate corresponding parts.

A represents an air-distributing vessel, to be placed in the vessel containing the milk or other liquid, provided with the vertical tubular extensions B and C; the former intended for the connection of the air-tube, conveying the air from the fan-blower E, or other means of forcing air.

The two are joined together by a bayonet-fastening, for convenience of ready attachment or detachment.

The extension C rises a short distance above the vessel, and is provided with a cap, F, and a valve, G, over a large passage from the vessel to the said extension, closing down upon the face of the vessel.

Small openings are formed through the said extension C, communicating with the radial chambers H, arranged upon the top of the shell of the vessel, having numerous perforations through the walls thereof.

Below the chambers, radial slots I are made through the top of the vessel, communicating with the space below.

Perforations K are made through the top of the vessel, leading from the annular space between the vertical extensions.

The air is forced down through the tube D into the vessel A, and from it, distributed throughout the liquid, rising to the top, and carrying off the heat.

The framing of the blowing-apparatus may rest on the top of the vessel containing the milk, and the jointed tube may be adjusted for vessels of various sizes.

I claim as new, and desire to secure by Letters Patent—

The combination of the distributing-vessel A, tube D, and blowing-apparatus, when constructed and arranged as specified.

The above specification of my invention signed by me, this 28th day of December, 1868.

IRA HOUGHTLING.

Witnesses:
JOHN PRYOR,
JACOB YOUNG.